(12) United States Patent
He (10) Patent No.: US 7,772,994 B2
(45) Date of Patent: Aug. 10, 2010

(54) AIRCRAFT GLIDE SLOPE DISPLAY SYSTEM AND METHOD

(75) Inventor: Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 779 days.

(21) Appl. No.: 11/652,185

(22) Filed: Jan. 11, 2007

(65) Prior Publication Data

US 2008/0169941 A1    Jul. 17, 2008

(51) Int. Cl.
*G01C 21/00* (2006.01)

(52) U.S. Cl. .............. 340/976; 340/967; 340/973; 340/979; 340/980; 703/13; 345/441; 345/581; 345/589

(58) Field of Classification Search .......... 340/976, 340/945, 946, 967, 971, 973, 974, 979; 345/441, 345/581, 589; 703/6, 13
See application file for complete search history.

(56) References Cited

U.S. PATENT DOCUMENTS

| | | | |
|---|---|---|---|
| 5,745,054 A | 4/1998 | Wilkens | |
| 5,745,863 A | 4/1998 | Uhlenhop et al. | |
| 7,132,960 B2 | 11/2006 | Glover | |
| 2002/0099528 A1 | 7/2002 | Hett | |
| 2004/0189492 A1 | 9/2004 | Selk, II et al. | |
| 2006/0224281 A1 | 10/2006 | Foucart et al. | |
| 2006/0227014 A1 | 10/2006 | Gannon | |

OTHER PUBLICATIONS

Keller, J.; Leiden, K; Information to Support the Human Performance Modeling of a B757 Flight Crew During Approach and Landing: RNAV, Jun. 18, 2002, XP-002479024, Boulder, CO.
EP Search Report, 08100292.5, dated May 23, 2008.

*Primary Examiner*—George A Bugg
*Assistant Examiner*—Sisay Yacob
(74) *Attorney, Agent, or Firm*—Ingrassia Fisher & Lorenz, P.C.

(57) ABSTRACT

A system and method for displaying aircraft glide slope includes determining a glide slope deviation that is representative of a difference between a desired aircraft glide slope and an actual aircraft glide slope. A glide slope icon that is representative of the desired aircraft glide slope and a glide slope deviation icon that is representative of the determined glide slope deviation are simultaneously rendered on a display.

22 Claims, 4 Drawing Sheets

AIRCRAFT GLIDE SLOPE DISPLAY SYSTEM AND METHOD

TECHNICAL FIELD

The present invention generally relates to aircraft flight deck display systems and methods and, more particularly, to a system and method for providing a more intuitive display of current aircraft glide slope relative to a desired aircraft glide slope.

BACKGROUND

Landing an aircraft is one of the most challenging tasks a pilot undertakes. During the landing process, the aircraft is transitioned from operating in three dimensions of motion to operating in two dimensions of motion, and brought to a stop. To perform the landing properly, the aircraft approaches the runway within certain attitude, course, speed, and rate of descent limits. The course limits include, for example, both lateral limits and glide slope limits. An approach outside of these limits can result in the aircraft landing short of the runway, overrunning the runway, or otherwise contacting the runway surface in an uncontrolled manner. Any one of these events is undesirable.

In some instances visibility may be poor during approach and landing operations, resulting in what is known as instrument flight conditions. During instrument flight conditions, pilots rely on instruments, rather than visibility, to navigate the aircraft. Many airports and aircraft include instrument landing systems (ILS) to help guide aircraft during approach and landing operations. These systems allow for the display of a lateral deviation indicator to indicate aircraft lateral deviation from the approach course, and the display of a glide slope indicator to indicate vertical deviation from the glide slope.

The glide slope indicator is typically displayed on an aircraft primary flight display. Although the manner in which the glide slope indicator is displayed may vary, more recent glide slope indicators are configured to display a dot, or other geometric symbol, on one side of the primary flight display. The geometric symbol may be displayed relative to another geometric symbol or set of symbols, to indicate whether the aircraft is above, below, or on the desired glide slope.

Although present glide slope indicators, including those described immediately above, are generally safe, reliable, and robust, these glide slope indicators do suffer certain drawbacks. For example, these glide slope indicators are displayed in a manner that may not intuitively depict the current aircraft glide slope deviation to the pilot. As a result, the pilot may not correctly maneuver the aircraft, at least initially, to reduce the glide slope deviation.

Hence, there is a need for a system and method of displaying aircraft glide slope to an aircraft flight crew that is more intuitive than presently used indicators. Furthermore, other desirable features and characteristics of the present invention will become apparent from the subsequent detailed description of the invention and the appended claims, taken in conjunction with the accompanying drawings and this background of the invention.

BRIEF SUMMARY

In one embodiment, and by way of example only, a method of displaying aircraft glide slope includes determining a glide slope deviation that is representative of a difference between a desired aircraft glide slope and an actual aircraft glide slope. A glide slope icon that is representative of the desired aircraft glide slope and a glide slope deviation icon that is representative of the determined glide slope deviation are simultaneously rendered on a display.

In another exemplary embodiment, a flight deck display system includes a processor and a display device. The processor is adapted to receive data representative of a desired aircraft glide slope, and data representative of a glide slope deviation. The processor is configured, upon receipt of these data, to supply glide slope image rendering display commands. The display device is coupled to receive the glide slope image rendering display commands and is operable, upon receipt thereof, to simultaneously render a glide slope icon that is representative of the desired aircraft glide slope and a glide slope deviation icon that is representative of the determined glide slope deviation.

BRIEF DESCRIPTION OF THE DRAWINGS

The present invention will hereinafter be described in conjunction with the following drawing figures, wherein like numerals denote like elements.

DETAILED DESCRIPTION OF A PREFERRED EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

Figure 1:
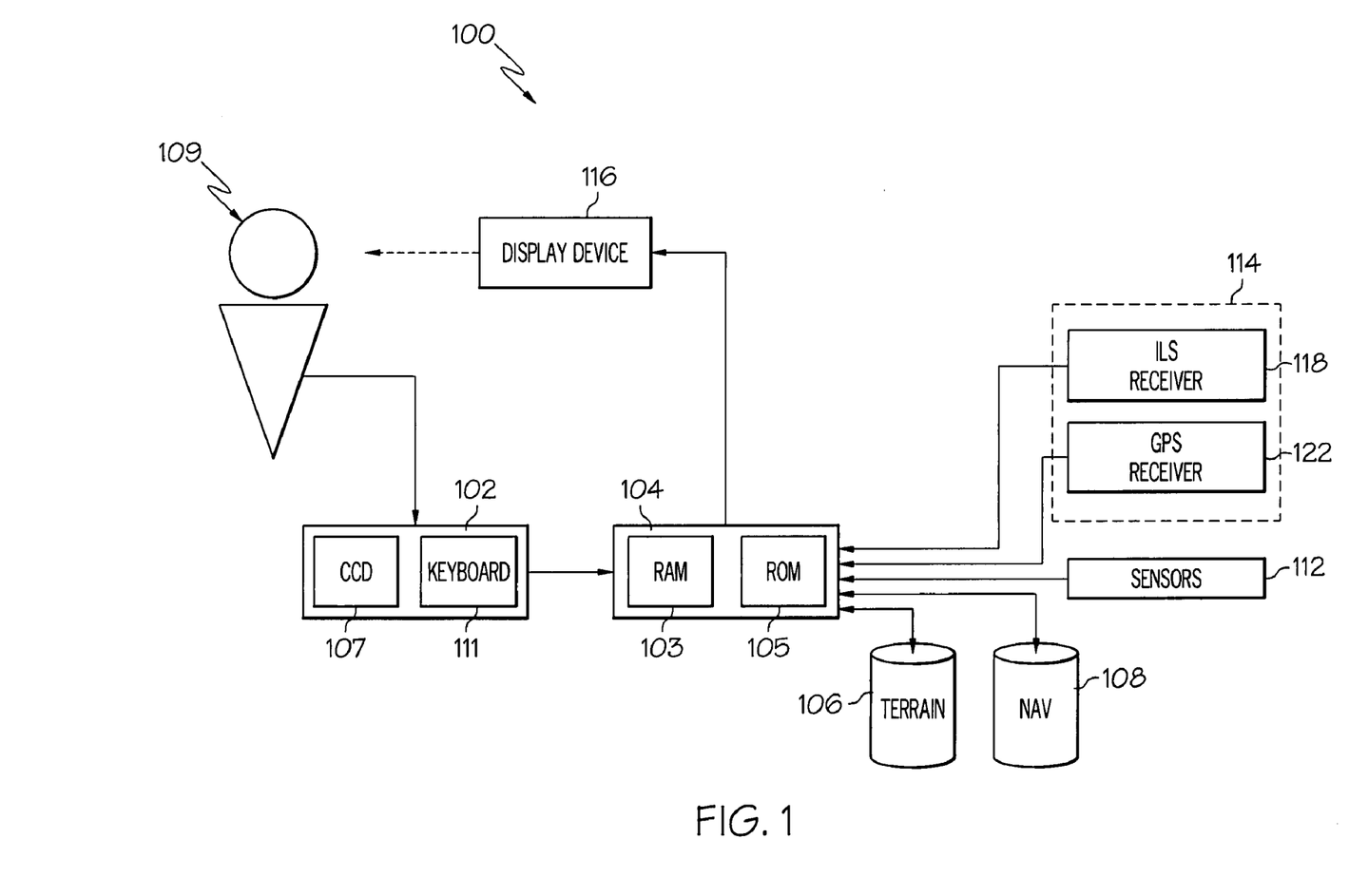
FIG. 1 is a functional block diagram of a flight deck display system according to an exemplary embodiment of the present invention.

Turning now to FIG. 1, an exemplary flight deck display system is depicted and will be described. The system 100 includes a user interface 102, a processor 104, one or more terrain databases 106, one or more navigation databases 108, various sensors 112, various external data sources 114, and a display device 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain databases 106, the navigation databases 108, and the display device 116, and is coupled to receive various types of inertial data from the various sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display device 116. The display device 116, in response to the display commands, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 112, and the external data sources 114, at least in the depicted embodiment, will be provided.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the RAM 103, or integrally formed as part of the processor 104, and/or RAM 103, and/or ROM 105. The terrain databases 106 and navigation databases 108 could also be part of a device or system that is physically separate from the system 100.

The sensors 112 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a terrain avoidance and warning system (TAWS), a traffic and collision avoidance system (TCAS), a runway awareness and advisory system (RAAS), a flight director, and a navigation computer, just to name a few. However, for ease of description and illustration, only an instrument landing system (ILS) receiver 118 and a global position system (GPS) receiver 122 are depicted in FIG. 1, and will now be briefly described.

As is generally known, the ILS is a radio navigation system that provides aircraft with horizontal (or localizer) and vertical (or glide slope) guidance just before and during landing and, at certain fixed points, indicates the distance to the reference point of landing on a particular runway. The system includes ground-based transmitters (not illustrated) that transmit radio frequency signals. The ILS receiver 118 receives these signals and, using known techniques, determines the glide slope deviation of the aircraft. As is generally known, the glide slope deviation represents the difference between the desired aircraft glide slope for the particular runway and the actual aircraft glide slope. The ILS receiver 118 in turn supplies data representative of the determined glide slope deviation to the processor 104.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

The display device 116 is used to display various images and data, in both a graphical and a textual format, and to supply visual feedback to the user 109 in response to the user input commands supplied by the user 109 to the user interface 102. It will be appreciated that the display device 116 may be implemented using any one of numerous known display devices suitable for rendering image and/or text data in a format viewable by the user 109. Non-limiting examples of such display devices include various cathode ray tube (CRT) displays, and various flat panel displays such as, various types of LCD (liquid crystal display) and TFT (thin film transistor) displays. The display device 116 may additionally be implemented as a panel mounted display, a HUD (head-up display) projection, or any one of numerous known technologies.

Figure 2:
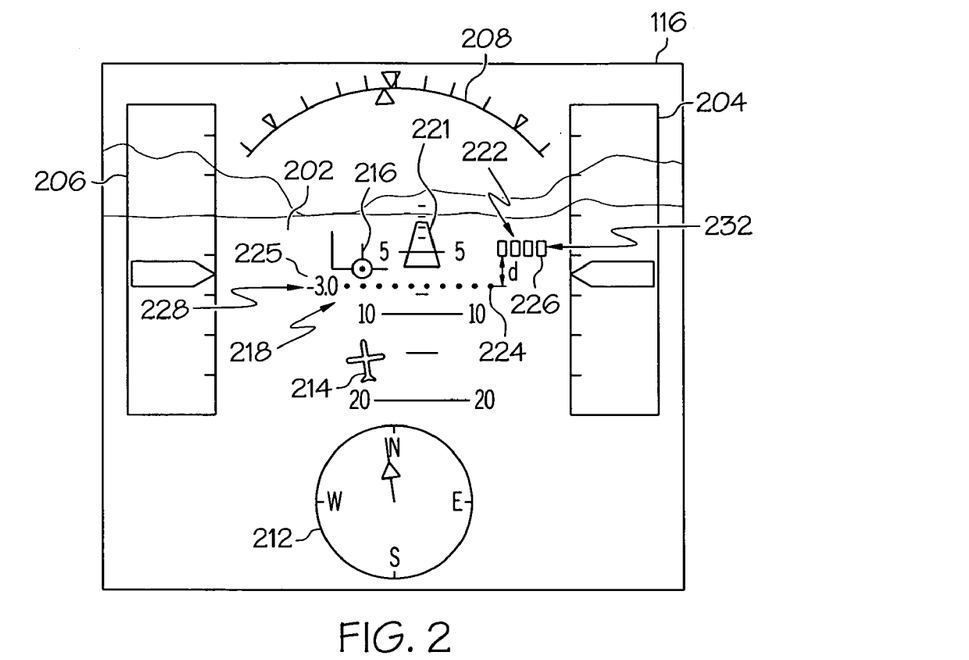
FIG. 2 depicts an exemplary image that may be rendered by the flight deck system of FIG. 1.

With reference now to FIG. 2, exemplary textual, graphical, and/or iconic information rendered by the display device 116, in response to appropriate display commands from the processor 104 is depicted. It is seen that the display device 116 renders a view of the terrain 202 ahead of the aircraft, preferably as a three-dimensional perspective view, an altitude indicator 204, an airspeed indicator 206, an attitude indicator 208, a heading indicator 212, an aircraft symbol 214, and a flight path vector indicator 216. In addition, and as will now be described in more detail, the display device 116, at least during an approach and/or landing mode of the aircraft, also selectively renders information representative of aircraft glide slope.

The information representative of aircraft glide slope includes a glide slope icon 218 and a glide slope deviation icon 222. The glide slope icon 218 is representative of the desired aircraft glide slope, referenced to the aircraft, for the specific runway 221 on which the aircraft is to land. The desired aircraft glide slope is determined, for example, by the processor 104 using data from the navigation database 108. It will be appreciated, however, that the desired aircraft glide slope may be determined by one or more other systems or subsystems, and from data or signals supplied from any one of numerous other systems or subsystems within, or external to, the aircraft. No matter the particular manner in which the desired aircraft glide slope is determined, the processor 104 supplies appropriate display commands to cause the display device 116 to render the glide slope icon 218.

With continued reference to FIG. 2, it is seen that the glide slope icon 218, at least in the depicted embodiment, is rendered as one or more, and most preferably as a series of, geometric symbols 224 and numeric data 225. The geometric symbols 224 are preferably rendered as a horizontal row of dots, and the numeric data 225 are preferably rendered as one or more Arabic numerals representative of the desired glide slope for the specific runway. Thus, in the embodiment depicted in FIG. 2, the glide slope icon 218 may be thought of as representing, for example, an imaginary line that extends from the aircraft, toward the runway 221, at an angle of −3.0 degrees. It will be appreciated that the use of a horizontal row of dots is merely exemplary, and that various other geometric symbols, such as a line, or a series of squares, triangles, or other geometric shapes, could also be used. It will additionally be appreciated that the numeric data 225 need not be rendered as Arabic numerals, and need not be rendered at all.

The glide slope deviation icon 222 is representative of the difference between the desired aircraft glide slope, referenced to the specific runway 221 on which the aircraft is to land, and the actual aircraft glide slope. The glide slope deviation, as described above, may be determined by the ILS receiver 118 or the GPS receiver 122. Moreover, it will be appreciated that in some embodiments both the ILS receiver and the GPS receiver 122 simultaneously determine the glide slope deviation. No matter the specific source of the determined glide slope deviation, a signal representative thereof is supplied to the processor 104, which in turn supplies appropriate display commands to cause the display device 116 to render the glide slope deviation icon 222.

As depicted in FIG. 2, the glide slope deviation icon 222 is rendered as one or more, and most preferably as a series of, geometric symbols 226. In the depicted embodiment, this series of geometric symbols is a horizontal row of relatively small squares. Moreover, for reasons that are discussed further below, the number of squares 226 in the horizontal row is four. It will be appreciated that the use of a horizontal row of squares 226 is merely exemplary, and that various other geometric symbols, such as a line, or a series of circles, triangles, or other geometric shapes, could also be used. It will additionally be appreciated that rendering the glide slope deviation icon 222 as a row of four geometric symbols 226 is merely exemplary of a particular preferred embodiment, and that other numbers of geometric symbols 226 could also be rendered.

The glide slope deviation icon 222, in addition to being rendered as one or more geometric shapes, is rendered on the display at a position that is offset from the glide slope icon 218 by a distance (d) that is proportional to the determined glide slope deviation. In the depicted embodiment, in which the glide slope icon 218 and the glide slope deviation icon 222 are each rendered as a horizontal row of geometric symbols 224, 226, the distance (d) is a vertical distance. Moreover, the glide slope deviation icon 222 and the glide slope icon 218 are rendered at positions relative to each other in a manner that indicates whether the aircraft is above or below the desired aircraft glide slope. More specifically, the glide slope icon 218 is rendered at a first position 228 and the glide slope deviation icon 222 is rendered at a second position 232. If the actual glide slope deviation is relatively large, then the distance (d) between the first and second positions 228, 232 will be relatively large. Conversely, if the actual glide slope deviation is relatively small, then the distance (d) between the first and second positions 228, 232 will be relatively small. As may be appreciated, if the actual glide slope deviation is zero (or at least substantially zero), meaning that the actual glide slope is equal to (or at least substantially equal to) the desired glide slope, then the glide slope icon 218 and the glide slope deviation icon 222 will be rendered in at least substantial horizontal alignment with each other.

Figure 3:
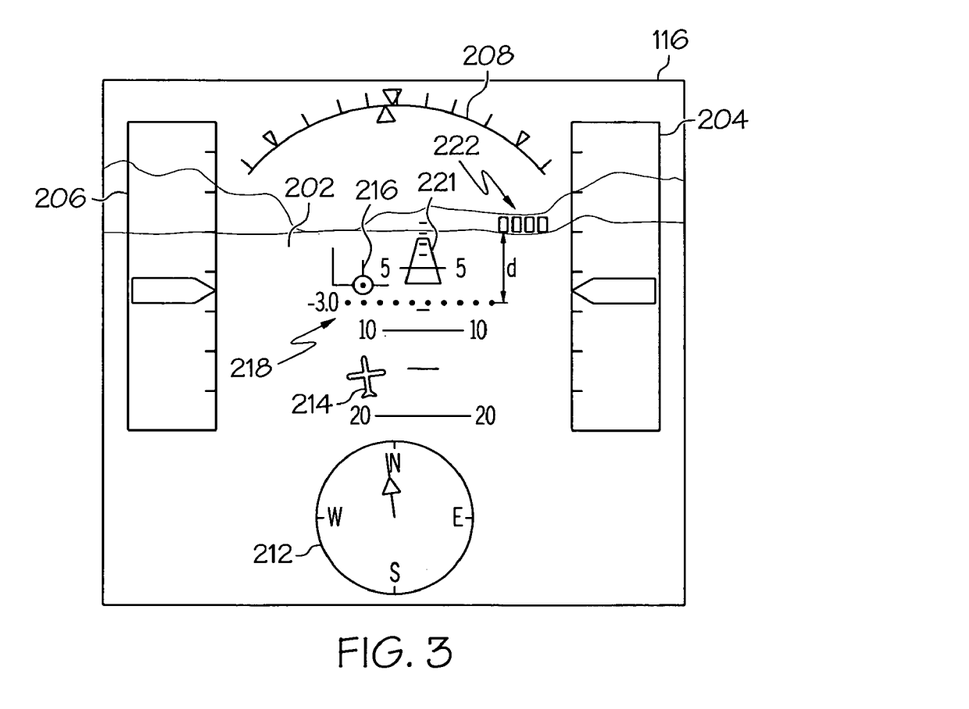
FIGS. 3-7 depict exemplary images that may be rendered by the flight deck system of FIG. 1 at various aircraft glide slopes.
Figure 4:
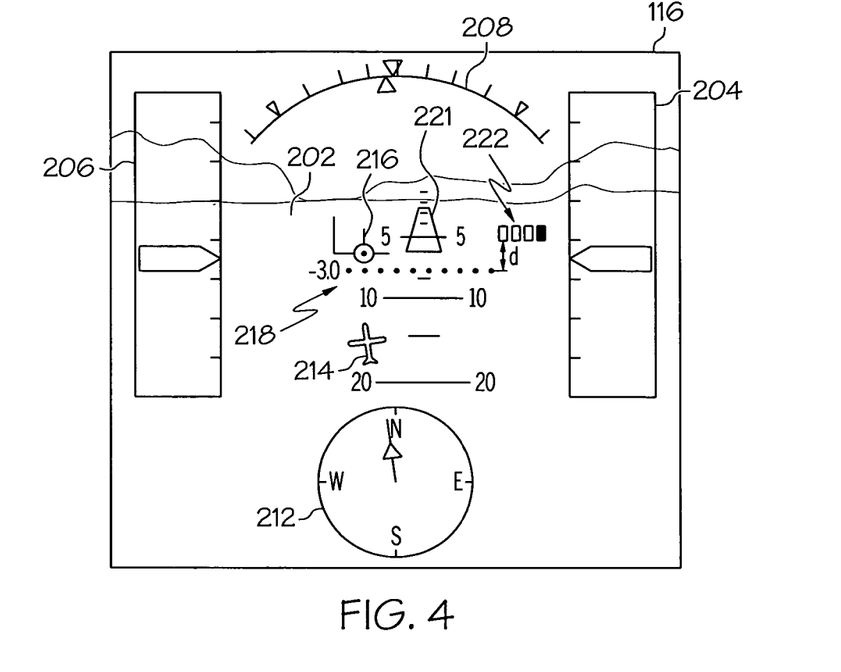
Figure 5:
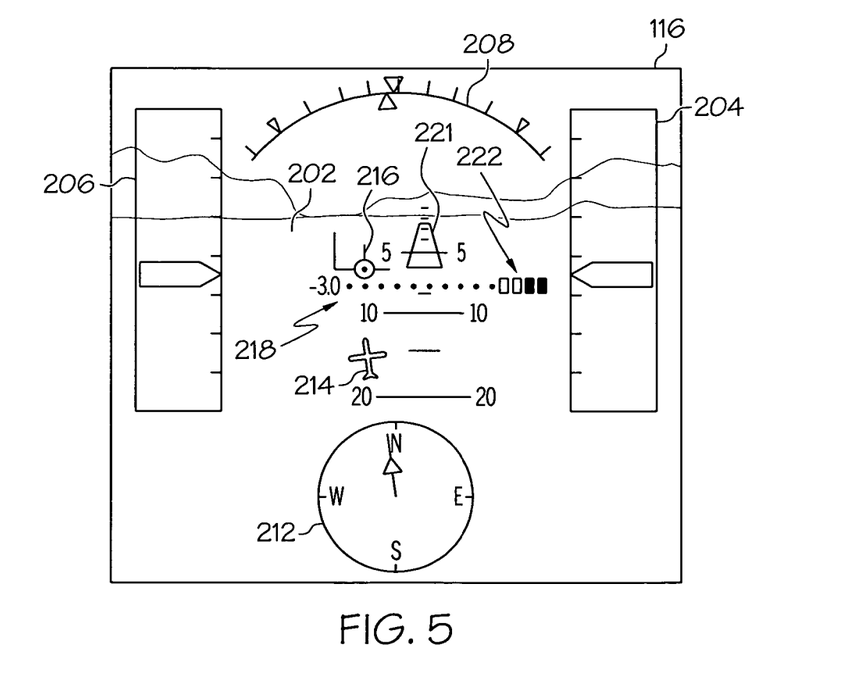

Referring now to FIGS. 3-5, the above discussion will be elaborated upon. With reference first to FIGS. 3, the display device 116 is depicted rendering the glide slope icon 218 and the glide slope deviation icon 222 when the aircraft is above the desired glide slope by a relatively large distance. Thus, it is seen that the glide slope deviation icon 222 is rendered above the glide slope icon 218, and the icons 218, 222 are offset from each other by a distance (d) that is proportional to the actual glide slope deviation. Turning now to FIG. 4, it is seen that as the pilot 109 maneuvers the aircraft to reduce the actual glide slope deviation, the distance (d) between the glide slope icon 218 and the glide slope deviation icon 222 decreases. The distance (d) will continue to decrease until, as depicted in FIG. 5, the actual glide slope deviation is zero (or at least substantially zero). When this occurs, the glide slope icon 218 and the glide slope deviation icon 222 are rendered in at least substantial horizontal alignment with each other.

Figure 6:
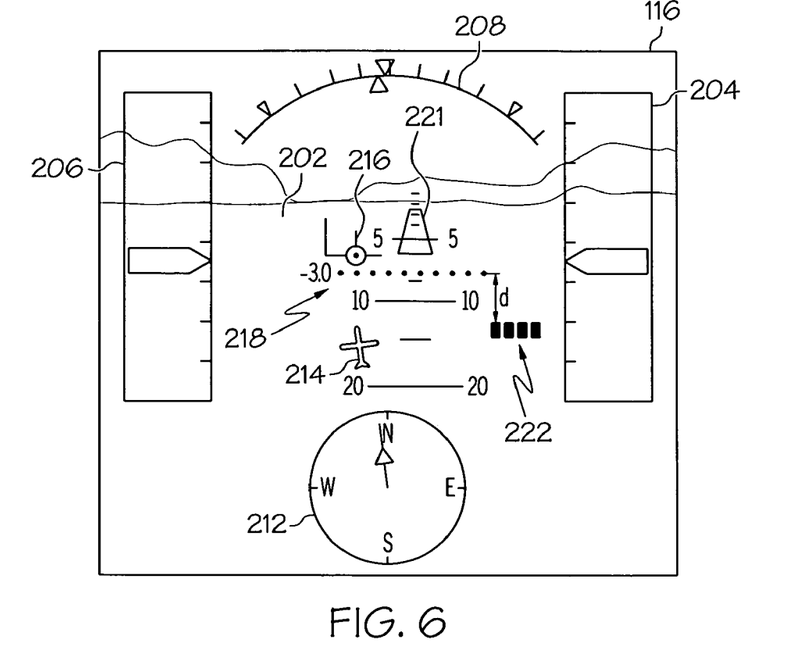
Figure 7:
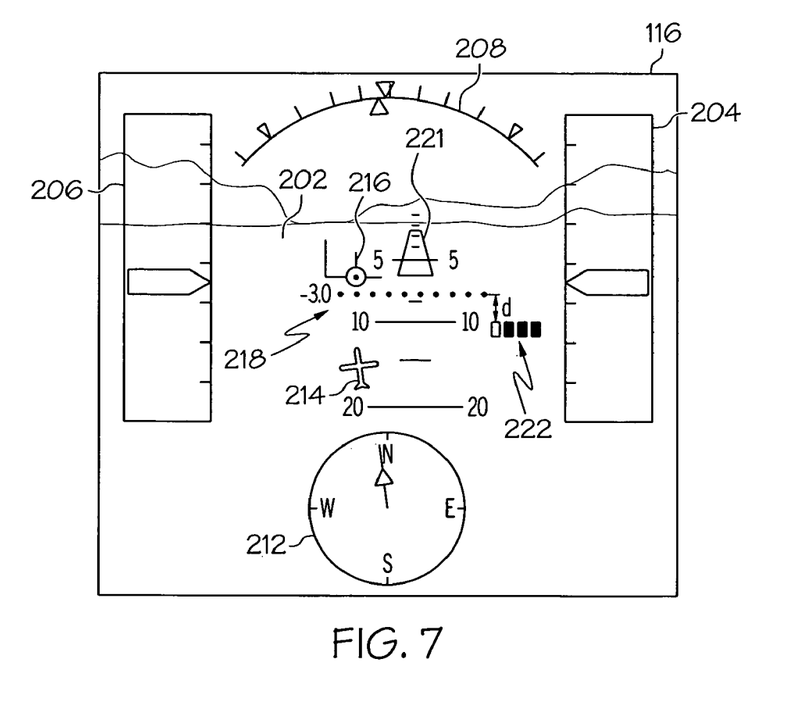

Turning now to FIGS. 6 and 7, the display device 116 is depicted rendering the glide slope icon 218 and the glide slope deviation icon 222 when the aircraft is below the desired glide slope. When, as depicted in FIG. 6, the aircraft is a relatively large distance below the desired glide slope, the glide slope deviation icon 222 is rendered below the glide slope icon 218, and the icons 218, 222 are offset from each other by a distance (d) that is proportional to the actual glide slope deviation. However, as depicted in FIG. 7, when the pilot 109 maneuvers the aircraft to reduce the actual glide slope deviation, the distance (d) between the glide slope icon 218 and the glide slope deviation icon 222 decreases. As described above, the distance (d) will continue to decrease until the actual glide slope deviation is zero (or at least substantially zero), at which point the glide slope icon 218 and the glide slope deviation icon 222 are rendered in at least substantial horizontal alignment with each other.

In addition to rendering the glide slope icon 218 and glide slope deviation icon 222 at positions and offset distances to indicate the actual aircraft glide slope deviation, the system 100 is also preferably configured to render the glide slope deviation icon 222 such that it provides a further indication of the relative glide slope deviation. In particular, the glide slope deviation icon 222 is preferably rendered as a series of polychromatic geometric symbols 226, in which each symbol is rendered in size, shape, or color that varies based on the actual glide slope deviation. The specific size and/or shapes in which the glide slope deviation icon geometric symbols 226 are rendered may vary. Moreover, the colors in which the glide slope deviation icon geometric symbols 226 are rendered may vary, but are preferably consistent with known color schemes, such as those implemented by known approach lighting systems (ALS) including, for example, a precision approach path indicator (PAPI), a visual approach slope indicator (VASI) (both bi-color and tri-color systems), and a pulsating visual approach slope indicator (PVASI) systems. In the depicted embodiment, the glide slope deviation icon 222 is rendered using a color scheme that mimics a PAPI, and thus for completeness will be briefly described.

As is generally known, a PAPI typically includes four lights in a line perpendicular to the runway. As is also generally known, the lights are configured such that the colors seen by an aircraft pilot provide an indication of how far the aircraft is from the desired glide slope, and in what direction. For example, if the pilot can see two white lights and to two red lights, this indicates that the aircraft is on the glide slope. One white light and three red lights indicates the aircraft is slightly below the glide slope, three white lights and one red indicates the aircraft is slightly above the glide slope, four red lights indicates the aircraft is relatively far below the glide slope, and four white lights indicates the aircraft is relatively far above the glide slope.

With reference once again to FIG. 3, it is seen that when the aircraft is relatively far above the desired glide slope, the glide slope deviation icon symbols 226 are each rendered in a first color, such as white. As the aircraft is maneuvered to decrease the glide slope deviation, and as depicted in FIG. 4, preferably one of the glide slope deviation icon symbols 226 will transition from the first color to a second color, such as red. Similarly, and with reference now to FIG. 6, when the aircraft is relatively far below the desired glide slope, the glide slope deviation icon symbols 226 are each rendered in the second color. However, as depicted in FIG. 7, as the aircraft is maneuvered to decrease the glide slope deviation, preferably one of the glide slope deviation icon symbols 226 will transition from the second color to the first color. In both cases, whether the aircraft is above or below the desired glide slope, when the aircraft is maneuvered to match the desired aircraft glide slope then, as depicted in FIG. 5, another of the glide slope deviation icon symbols 226 will transition from the first color to the second color.

It will be appreciated that the system 100 could be configured to implement the above-described transition from the first color to the second color as a gradual transition. For example, if the first and second colors are white and red, respectively, then as the glide slope deviation is reduced, the color of the two glide slope deviation icon symbols 226 would gradually transition from white to red. It will additionally be appreciated that white and red are merely exemplary of two colors that may be used, and that various other colors and shades thereof may be used. Moreover, and as was alluded to above, the color scheme that the system 100 implements, if at all, need not mimic the PAPI color scheme. Rather, the color scheme and glide slope deviation icon 222 configuration could mimic any one of the other known ALS schemes, or ones disparate from these known schemes.

The system 100 may also be configured, at least in some embodiments, to operate either an ILS mode or a GPS mode. In the ILS mode, the ILS receiver 118 is used to determine the glide slope deviation, and in the GPS mode, the GPS receiver 122, or signals supplied therefrom, is used to determine the glide slope deviation. Moreover, the system 100 may also be configured to compare the glide slope deviation determinations derived from the ILS receiver 118 and the GPS receiver 122. If the comparison indicates that the glide slope deviation determinations differ by a predetermined threshold magnitude, the system 100, via appropriate commands from the processor 104, may issue one or more visual indications, aural indications, or both. This comparison can be used to indicate one or more faults associated with one of these systems. For example, the glide slope deviation determinations could differ by the predetermined threshold magnitude if the ILS receiver 118 or the GPS receiver 122 are faulty, or if one or more of the glide slope signal emitters associated with a runway are faulty.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of displaying aircraft glide slope, comprising the steps of:
   determining a glide slope deviation, the glide slope deviation representative of a difference between a desired aircraft glide slope and an actual aircraft glide slope; and
   simultaneously rendering on a display (i) a glide slope icon that is representative of the desired aircraft glide slope and (ii) a glide slope deviation icon that is representative of the determined glide slope deviation, wherein:
the glide slope icon is rendered on the display at a first position and as a series of monochromatic geometric symbols,
the glide slope deviation icon is rendered on the display at a second position and as a series of polychromatic geometric symbols, and
the first and second positions are offset by a distance that is proportional to the determined glide slope deviation.

2. The method of claim 1, wherein the first and second positions are offset by a vertical distance that is at least proportional to the determined glide slope deviation.

3. The method of claim 1, wherein the glide slope icon and the glide slope deviation icon are rendered on the display in at least substantial horizontal alignment with each other when the actual aircraft glide slope is at least substantially equal to the desired aircraft glide slope.

4. The method of claim 1, wherein the polychromatic geometric symbols are each at least partially rendered in a color that varies based on the determined glide slope deviation.

5. The method of claim 4, wherein:
the series of polychromatic geometric symbols is four symbols; and
each symbol is at least partially rendered in a first color or a second color, based on the determined glide slope deviation.

6. The method of claim 5, further comprising:
rendering at least three of the symbols at least partially in the first color if the determined glide slope deviation indicates the actual aircraft glide slope is below the aircraft desired glide slope; and
rendering at least three of the polychromatic geometric symbols at least partially in the second color if the determined glide slope deviation indicates the actual aircraft glide slope is above the desired aircraft glide slope.

7. The method of claim 1, further comprising:
determining the glide slope deviation from instrument landing system (ILS) data.

8. The method of claim 1, further comprising:
determining the glide slope deviation from global positioning system (GPS) data and aircraft data.

9. The method of claim 1, further comprising:
determining the glide slope deviation from instrument landing system (ILS) data.;
determining the glide slope deviation from global positioning system (GPS) data and aircraft data;
comparing the glide slope deviation determined from the ILS data and the glide slope deviation determined from the GPS data; and
generating an alert when the glide slope deviation determined from the ILS data and the glide slope deviation determined from the GPS data differ by a predetermined limit.

10. A flight deck display system, comprising:
a processor adapted to receive (i) data representative of a desired aircraft glide slope and (ii) data representative of a glide slope deviation, the processor configured, upon receipt of these data, to supply glide slope image rendering display commands; and
a display device coupled to receive the glide slope image rendering display commands and operable, upon receipt thereof, to simultaneously render (i) a glide slope icon that is representative of the desired aircraft glide slope and (ii) a glide slope deviation icon that is representative of the determined glide slope deviation, wherein:
the display device, upon receipt of the glide slope image rendering display commands, renders (i) the glide slope icon at a first position and as a series of monochromatic geometric symbols and (ii) the glide slope deviation icon at a second position and as a series of polychromatic geometric symbols, and
the first and second positions are offset by a distance that is proportional to the determined glide slope deviation.

11. The system of claim 10, wherein the first and second positions are offset by a vertical distance that is at least proportional to the determined glide slope deviation.

12. The system of claim 10, wherein the display device, upon receipt of the glide slope image rendering display commands, renders the glide slope icon and the glide slope deviation icon in at least substantial horizontal alignment with each other when the glide slope deviation is at least substantially equal zero.

13. The system of claim 10, wherein the display device is further operable, upon receipt of the glide slope image rendering display commands, to render each polychromatic geometric symbol at least partially in a color that varies based on the glide slope deviation.

14. The system of claim 13, wherein:
the display device is further operable, upon receipt of the glide slope image rendering display commands, to render the series of polychromatic geometric symbols as four symbols; and
each symbol is at least partially rendered in a first color or a second color, based on the glide slope deviation.

15. The system of claim 14, wherein the glide slope image rendering display commands supplied from the processor cause the display device to:
render at least three of the symbols at least partially in the first color if the glide slope deviation indicates actual aircraft glide slope is below the desired aircraft glide slope; and
render at least three of the polychromatic geometric symbols at least partially in the second color if the determined glide slope deviation indicates the actual aircraft glide slope is above the desired aircraft glide slope.

16. The system of claim 10, further comprising:
an instrument landing system (ILS) adapted to receive ILS signals and operable, upon receipt thereof, to determine the glide slope deviation and supply the glide slope deviation data to the processor.

17. The system of claim 10, further comprising:
a global positioning system adapted to receive GPS signals and operable, upon receipt thereof, to determine the glide slope deviation and supply the glide slope deviation data to the processor.

18. The system of claim 10, further comprising:
an instrument landing system (ILS) adapted to receive ILS signals and operable, upon receipt thereof, to determine the glide slope deviation and supply the glide slope deviation data to the processor; and
a global positioning system adapted to receive GPS signals and operable, upon receipt thereof, to determine the glide slope deviation and supply the glide slope deviation data to the processor,
wherein the processor is further operable to (i) compare the glide slope deviation determined by the ILS and the glide slope deviation determined by the GPS and (ii) generate an alert if the glide slope deviation determined by the ILS and the glide slope deviation determined by the GPS differ by a predetermined limit.

19. A method of displaying aircraft glide slope, comprising the steps of:
- determining a glide slope deviation, the glide slope deviation representative of a difference between a desired aircraft glide slope and an actual aircraft glide slope; and
- simultaneously rendering on a display (i) a glide slope icon that is representative of the desired aircraft glide slope and (ii) a glide slope deviation icon that is representative of the determined glide slope deviation,
- wherein:
  - the glide slope icon is rendered as one or more geometric symbols, and
  - the glide slope deviation icon is as one or more geometric symbols that vary in size based on the determined glide slope deviation.

20. A method of displaying aircraft glide slope, comprising the steps of:
- determining a glide slope deviation, the glide slope deviation representative of a difference between a desired aircraft glide slope and an actual aircraft glide slope; and
- simultaneously rendering on a display (i) a glide slope icon that is representative of the desired aircraft glide slope and (ii) a glide slope deviation icon that is representative of the determined glide slope deviation,
- wherein:
  - the glide slope icon is rendered as one or more geometric symbols, and
  - the glide slope deviation icon is rendered as one or more geometric symbols that vary in shape based on the determined glide slope deviation.

21. A flight deck display system, comprising:
- a processor adapted to receive (i) data representative of a desired aircraft glide slope and (ii) data representative of a glide slope deviation, the processor configured, upon receipt of these data, to supply glide slope image rendering display commands; and
- a display device coupled to receive the glide slope image rendering display commands and operable, upon receipt thereof, to simultaneously render (i) a glide slope icon that is representative of the desired aircraft glide slope and (ii) a glide slope deviation icon that is representative of the determined glide slope deviation,
- wherein:
  - the glide slope icon is rendered as one or more geometric symbols, and
  - the glide slope deviation icon is rendered as one or more geometric symbols that vary in size based on the determined glide slope deviation.

22. A flight deck display system, comprising:
- a processor adapted to receive (i) data representative of a desired aircraft glide slope and (ii) data representative of a glide slope deviation, the processor configured, upon receipt of these data, to supply glide slope image rendering display commands; and
- a display device coupled to receive the glide slope image rendering display commands and operable, upon receipt thereof, to simultaneously render (i) a glide slope icon that is representative of the desired aircraft glide slope and (ii) a glide slope deviation icon that is representative of the determined glide slope deviation,
- wherein:
  - the glide slope icon is rendered as one or more geometric symbols, and
  - the glide slope deviation icon is rendered as one or more geometric symbols that vary in shape based on the determined glide slope deviation.

\* \* \* \* \*